(12) United States Patent
Burt et al.

(10) Patent No.: US 6,848,526 B2
(45) Date of Patent: Feb. 1, 2005

(54) MORTAR BUGGY

(75) Inventors: Christopher M. Burt, Canandaigua, NY (US); Guy W. Boor, Geneseo, NY (US)

(73) Assignee: Stone Construction Equipment, Inc., Honeoye, NY (US)

( * ) Notice: Subject to any disclaimer, the term of this patent is extended or adjusted under 35 U.S.C. 154(b) by 68 days.

(21) Appl. No.: 10/231,458

(22) Filed: Aug. 30, 2002

(65) Prior Publication Data

US 2004/0040761 A1 Mar. 4, 2004

(51) Int. Cl.$^7$ .............................................. B60B 11/00
(52) U.S. Cl. ................ 180/69.4; 301/36.1; 301/35.628; 298/1 C
(58) Field of Search .......................... 301/36.1, 35.628, 301/35.629; 180/65.1, 65.2, 65.3, 65.4, 69.4, 69.5; 298/1 C, 2; 81/10; 70/225; 74/562.5; 280/87.041, 87.042

(56) References Cited

U.S. PATENT DOCUMENTS

| | | | | |
|---|---|---|---|---|
| 708,346 A | * | 9/1902 | Grondin et al. ............. 254/3 R |
| 1,855,068 A | * | 4/1932 | Remde ....................... 414/634 |
| 1,986,134 A | * | 1/1935 | Burrows et al. ............ 180/292 |
| 2,635,012 A | * | 4/1953 | Rappaport ................. 301/36.1 |
| 2,935,278 A | * | 5/1960 | Lesley .................... 244/103 R |
| 3,837,708 A | * | 9/1974 | Donnell ......................... 301/1 |
| 3,840,273 A | * | 10/1974 | Johns ........................ 301/36.1 |
| 3,860,297 A | * | 1/1975 | Solis ......................... 301/38.1 |
| 3,891,043 A | * | 6/1975 | Valdex ......................... 180/13 |
| 4,037,852 A | * | 7/1977 | Bayer et al. ........... 280/87.042 |
| 4,168,076 A | * | 9/1979 | Johnson ................. 280/11.216 |
| 4,522,281 A | * | 6/1985 | Snider ......................... 180/208 |
| 4,538,695 A | * | 9/1985 | Bradt ......................... 180/19.2 |
| 4,611,684 A | * | 9/1986 | Geschwender .............. 180/223 |
| 4,718,732 A | * | 1/1988 | Osborne .................... 301/36.1 |
| 4,818,109 A | * | 4/1989 | Hutchings et al. .......... 356/468 |
| 4,819,523 A | * | 4/1989 | Souza ........................ 81/177.2 |
| 4,878,339 A | * | 11/1989 | Marier et al. ................. 56/14.7 |
| 4,887,685 A | * | 12/1989 | Shepard et al. ............. 180/209 |
| 4,968,205 A | * | 11/1990 | Biasotto et al. ............ 414/24.6 |
| 4,991,861 A | * | 2/1991 | Carn et al. ............. 280/87.042 |
| 5,081,365 A | * | 1/1992 | Field et al. .................... 290/45 |
| 5,146,892 A | * | 9/1992 | Krampe et al. ............. 123/399 |
| 5,301,644 A | * | 4/1994 | Olmr .................... 123/198 DB |
| 5,706,909 A | * | 1/1998 | Bevins et al. ................ 180/273 |
| 5,785,136 A | * | 7/1998 | Falkenmayer et al. ..... 180/65.2 |
| 5,788,597 A | * | 8/1998 | Boll et al. ...................... 477/4 |
| 6,070,946 A | * | 6/2000 | Holmes ...................... 301/36.1 |
| 6,129,166 A | * | 10/2000 | Sueshige et al. ........... 180/65.6 |
| 6,155,648 A | * | 12/2000 | Dombek et al. ............ 298/1 C |

(List continued on next page.)

OTHER PUBLICATIONS

We've re-engineered the Power Buggy, Whiteman Industries, Inc., date unknown.
"Internet Picture of Mortar Buggy", Oct. 9, 2001.

Primary Examiner—Christopher P. Ellis
Assistant Examiner—Kelly E Campbell
(74) Attorney, Agent, or Firm—Jacobson Holman PLLC

(57) ABSTRACT

A quick release hub for the outer tires and wheels of dual wheel assemblies on a vehicle such as a mortar buggy to enable the vehicle to move through a narrow doorway or other passageway having a width less than the total distance between the outermost surfaces of the outer tires. The quick release hub includes a two component hub secured together by a single fastening device which enables quick and easy removal and replacement of the outer tires and wheels. A combination engine electrical control switch for the mortar buggy engine automatically controls a fuel supply valve to open and close the fuel valve in response to the engine control switch. An operator's platform and brake actuator are mounted at the rear of the mortar buggy with the brake actuator extending transversely at the forward portion of the platform to enable an operator to use either foot to operate the brake actuator.

15 Claims, 9 Drawing Sheets

U.S. PATENT DOCUMENTS

| | | | |
|---|---|---|---|
| 6,182,778 B1 * | 2/2001 | Henshaw et al. | 180/89.12 |
| 6,223,844 B1 * | 5/2001 | Greenhill et al. | 180/65.3 |
| 6,250,722 B1 * | 6/2001 | Radke | 301/36.1 |
| 6,322,151 B2 * | 11/2001 | Dombek et al. | 298/1 C |
| 6,334,079 B1 * | 12/2001 | Matsubara et al. | 701/22 |
| 6,371,092 B1 * | 4/2002 | Guglielmo et al. | 123/527 |
| 6,397,961 B1 * | 6/2002 | Sutton | 180/65.1 |
| 6,578,924 B2 * | 6/2003 | Jansen et al. | 298/1 C |
| 6,615,940 B2 * | 9/2003 | Morisawa | 180/65.1 |
| 6,619,754 B1 * | 9/2003 | Dombek et al. | 298/1 C |
| 2001/0000641 A1 * | 5/2001 | Dombek et al. | 298/7 |

* cited by examiner

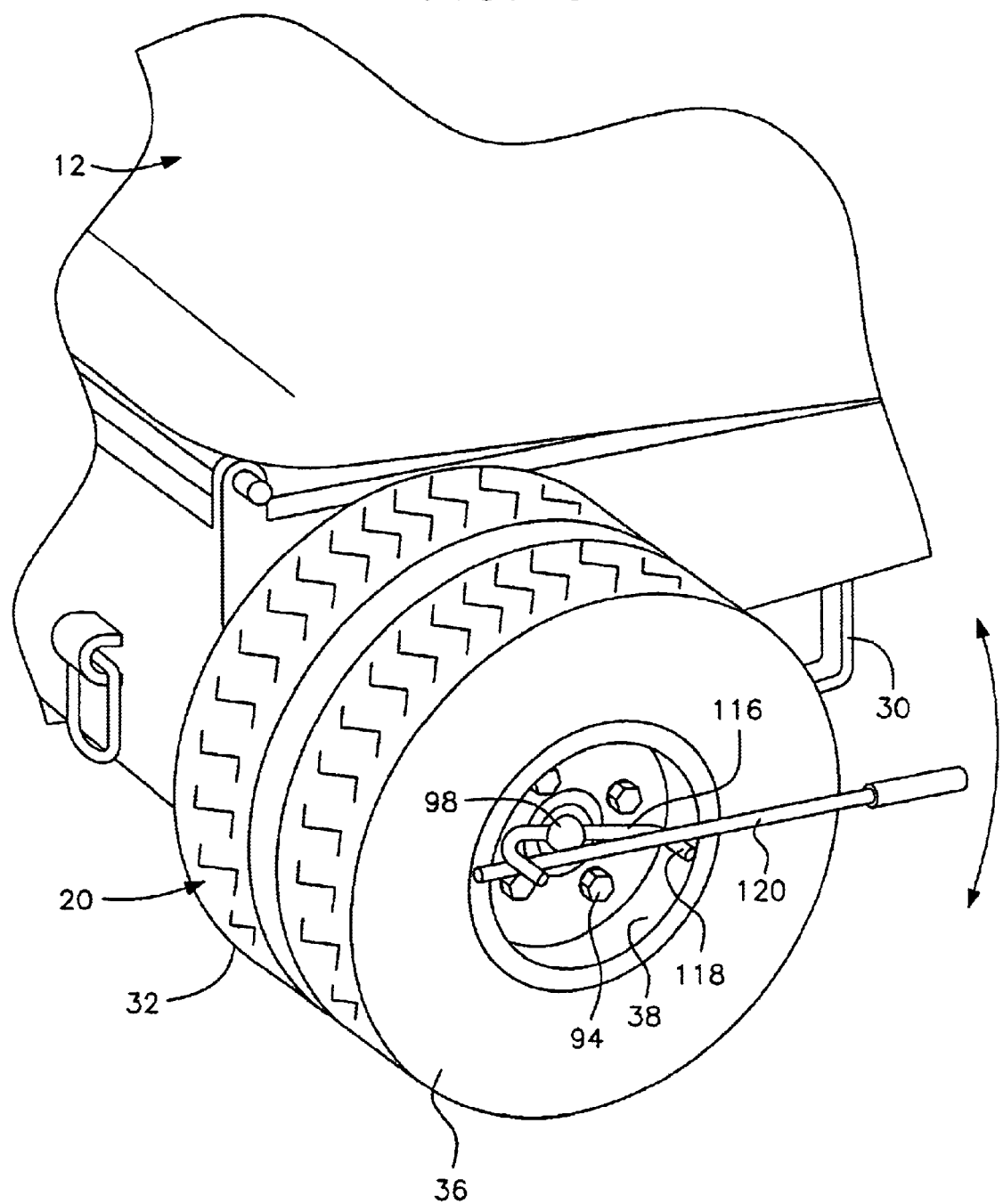

MORTAR BUGGY

BACKGROUND OF THE INVENTION

1. Field of the Invention

The present invention generally relates to a powered material transporting vehicle generally known in the art as a mortar buggy for moving material, primarily mortar, concrete, gravel, dirt or other material capable of being placed in a hopper or bucket for transport to a job site and dumped by tilting the hopper or bucket. The mortar buggy includes a powered pivotal hopper, dual supporting and driving wheels at each side of the front of the buggy, dual wheels on a single steerable rear axle at the rear, a rear operator's platform and controls accessible to the operator. The mortar buggy of the present invention includes structure for quick release of the outer wheel and tire thereon from each set of dual front wheels in order to reduce the maximum width of the buggy. This enables the buggy to pass through a narrow doorway or the like in order to gain access to a job site where the contents of the mortar buggy hopper will be used in various building construction operations. The structure also enables the outer front wheels and tires to be quickly and easily replaced.

The mortar buggy of the present invention also includes a unique operator's platform and brake actuator which enables an operator to use either foot to actuate the front wheel brakes. The operator's platform is located in relation to controls to enable efficient and safe operation of the mortar buggy. The operator's platform includes a brake operating member in the form of a generally U-shaped, pivotally supported bar extending transversely of substantially the entire width of the forward edge area of the operator's platform to enable the mortar buggy brakes to be applied by either foot of an operator. This enables the operator to maintain a stable position on the platform especially when the mortar buggy is turning or traversing an inclined surface. Also, the U-shaped bar includes a splash guard forming a closure for the interior of the U-shaped bar and a depending flange along the portion of the U-shaped bar engaged by the foot of an operator thereby preventing mud, water and debris from being thrown onto the feet of the operator when operating the mortar buggy.

The controls for operating the mortar buggy includes a combination engine electrical and fuel shut off including a fuel supply valve between a fuel tank and the engine. This arrangement automatically closes the fuel supply valve to terminate flow of fuel to the engine when the engine electrical and fuel shut off is moved to an off or stop position. This arrangement eliminates the necessity of the operator manually closing the fuel supply valve when operation of the engine is terminated thereby eliminating the possibility of fuel flowing through the engine fuel system onto the ground, floor or the like.

2. Description of the Prior Art

Prior art mortar buggies having dual supporting and driving wheels utilize a tubular axle extension having a flange on an inner end connected to an inner wheel and brake drum or flange or hub on a drive shaft by conventional lug bolts and lug nuts oriented in a normal five lug pattern. The axle extension also includes a hub at its outer end to mount an outer wheel thereon by lug bolts and nuts arranged in a conventional five lug pattern. In the prior art, when removal of the outer wheels is required, it is necessary to remove the lug bolts securing the outer wheels to the axle extensions, remove lug nuts holding a flange on the inner end of the axle extensions to the brake drum if used or to hubs mounted directly to the drive shaft or axle, remove the axle extensions and reapply the lug nuts to retain the inner wheels assembled with respect to the brake drums or inner hubs secured directly to the drive shaft or axle. After removal of the outer wheels from the hubs on the outer end of the tubular axle extensions by removing the five lug bolts, it then becomes necessary to remove the lug nuts which secure the flange on the inner end of the tubular axle extension by using a manually operated lug wrench or a power driven lug wrench. Additionally, the outer tire and wheel, the lug nuts and bolts, and the tubular axle extension become separate components subject to being misplaced or covered with dirt or debris. Also, the procedure in the prior art requires considerable manual dexterity and substantial strength capabilities in aligning the lug openings in the wheels with the lug bolts and assembly of the lug nuts and lug bolts when the outer tire and wheel is reassembled after passage of the mortar buggy through a doorway or other similar restricted space.

Also, prior art mortar buggies include an operator's platform having a wheel brake actuator in the form of a pedal pivotally supported outboard of the operator's platform or in overlying relation to one side edge of the platform thereby requiring that an operator always use the same foot to operate the brake pedal.

Prior art operator platforms on mortar buggies are sometimes perforated and constructed in a manner which enables dirt, mud, water and debris to become deposited on the platform and feet of an operator during operation of the mortar buggy which adversely affects effective control of the mortar buggy and can cause the operator to slip on the platform. In addition, a manually controlled fuel supply valve is provided in the gasoline supply system for the engine which requires the operator to manually close the valve at the end of a use cycle of the mortar buggy to prevent gasoline from being supplied to the engine during periods of non-use.

SUMMARY OF THE INVENTION

The mortar buggy with quick release hub of the present invention enables the outer tires and wheels of dual wheel assemblies at the front and each side of a mortar buggy to be quickly and easily removed and replaced in less time and with less labor thereby enabling a mortar buggy to quickly move through a narrow doorway in order to deliver more mortar to a job site in a given time. The quick release hub of the outer tires and wheels does not require any special tools or any lifting equipment and reduces the possibility of hub components becoming misplaced or covered with dirt and debris which can occur due to job sites often having loose debris, dirt and the like. The elimination of a lifting apparatus necessary to lift prior art mortar buggies off the ground surface provides a safer, faster and easier operation. The mortar buggy using the quick release hub of the present invention may be driven so that the inner tire engages and is supported by a block with the outer tire and wheel then being elevated so that it can be easily removed and replaced when necessary.

The quick release hub for the outer tire and wheel of the present invention includes a two-piece axle extension with the outer hub component of the axle extension being secured to the inner hub component of the axle extension by an elongated rod-like screw threaded member having screw threaded engagement with an inner hub component of the axle extension. The outer end of the threaded member includes a transversely extending rod-like structure having a projection at each outer end thereof. The projections are generally parallel to the threaded member but radially spaced therefrom so that a rigid rod-like tool can be engaged with the projections and the threaded member rotated when removing and replacing an outer hub component of the axle extension as well as the outer tire and wheel which remains attached to the outer component of the hub. The inner and outer hub components of the axle extension include a separable driving connection in the form of a plurality of axial pins rigidly affixed to the outer hub component of the axle extension which are received in radial slots in the axial face of the inner hub component of the axle extension. The driving connection is separated when the outer hub component of the axle extension is removed along with the outer tire and wheel and easily connected when the outer tire and wheel is reassembled onto the mortar buggy.

To reassemble, the outer tire and wheel and outer hub component of the axle extension are merely engaged with the inner hub component of the axle extension with the slots in the axial face of the inner hub component receiving the pins on the outer hub component and the screw threaded member extended through the outer hub component into screw threaded engagement with the inner hub component. The screw threaded member is then tightened by using the elongated rigid rod-like tool engaged with the two projections on the ends of the transverse member at the outer end of the threaded member. This enables the entire outer tire and wheel and outer hub component to be removed and replaced without using a jack or other lift device by utilizing only a single threaded member which can be loosened and tightened by utilizing any elongated rigid bar-like tool engaging the spaced projections on the transverse member at the outer end of the threaded member. The driving connection between the hub components is automatically disengaged when the outer tire and wheel is removed and can be easily connected as the outer hub component and tire and wheel are reconnected to the inner hub component of the axle extension.

The brake actuator of the mortar buggy of the present invention includes a pivotal member extending transversely above a forward edge portion of the operator's platform and extending over a major portion of the width of the platform immediately forward of the front edge thereof to enable an operator to use either foot to depress the brake actuator. The actuator includes a generally U-shaped bar member having legs with their forward ends pivotally supported from the buggy frame and a bight portion located adjacent and slightly above the forward edge of the operator's platform thereby requiring minimal movement of either foot to apply the brakes on the mortar buggy.

A splash guard plate is disposed interiorly of a rearward portion of the U-shaped bar member and a depending splash guard is attached to a rearward portion of the U-shaped member to prevent dirt or debris from interfering with operation of the brake actuator and from becoming lodged on the upper surface of the operator's platform.

The gasoline supply system between the tank and engine of the mortar buggy of the present invention includes a valve that is moved automatically between open and closed positions when a combination electrical and fuel shut off is moved between run and stop positions. This assures that the gasoline supply is isolated from the engine during periods of non-use to eliminate any possibility of gasoline being leaked into the engine or onto the floor or ground during periods of non-use of the mortar buggy.

Accordingly, an object of the present invention is to provide a quick release hub for the outer tire and wheel of a dual wheel vehicle supporting and driving assembly which includes a single screw threaded retaining member detachably securing and drivingly connecting the outer tire and wheel to an inner tire and wheel with the threaded member interconnecting an outer hub component and an inner hub component of an axle extension extending between the outer wheel and the inner wheel.

Another object of the invention is to provide an axle extension between an inner wheel and outer wheel of a dual wheel supporting and driving structure for a vehicle such as a mortar buggy in which the axle extension includes an outer hub component and an inner hub component interconnected by a single threaded retaining member having an inner threaded end engaged with an inner hub component connected to an inner wheel and a transverse member retaining the outer hub component of the axle extension and the outer wheel connected to the inner hub component. The outer end of the threaded member includes laterally spaced longitudinal projections extending outwardly from the outer wheel for engagement by an elongated, rigid rod-like tool that extends between and engages the projections in a manner to provide leverage for removing and replacing the threaded retaining member to quickly release and quickly reattach the outer wheel and tire.

A further object of the invention is to provide a quick release hub for each of the outer wheels of dual front wheels on a mortar buggy to enable the outer wheels to be quickly removed to enable passage of a mortar buggy or the like supported only by the inner wheels through a doorway after which the outer wheels can be quickly and easily remounted on the inner wheels thereby enabling faster and more efficient delivery of material through a doorway.

Still another object of the invention is to provide a quick release hub for the outer wheels of dual driving and supporting wheels at the front end of a mortar buggy to enable quick and easy removal of the outer wheels by use of a two component axle extension between the wheels constructed with an interengaging pin and slot driving connection that automatically separates when the outer wheels are removed and is reconnected when the outer wheels are replaced. This construction enables the mortar buggy to proceed through doorways and the like when the outer wheels are removed with the outer wheels then being quickly reassembled in relation to the inner wheels on each pair of dual wheels.

A still further object of the present invention is to provide a mortar buggy with a rear operator's platform with a brake actuator extending transversely at a forward edge thereof which enables an operator to engage and actuate the brake actuator with either foot.

Yet another object of the present invention is to provide a brake actuator in accordance with the preceding object which is provided with a splash guard to shield the brake actuator and operator's platform from dirt and debris during operation of the mortar buggy.

Yet a further object of the present invention is to provide a mortar buggy having a gasoline powered engine with a valve in a gasoline supply system to open and close in response to a combination electrical and fuel shut off to isolate the gasoline supply from the engine during periods of non-use of the engine.

An additional object of this invention to be specifically enumerated herein is to provide a mortar buggy in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTIONS OF THE DRAWINGS

FIG. 3 is a perspective view illustrating the manner in which the quick release hub for the outer wheel is tightened or loosened.

DESCRIPTION OF THE PREFERRED EMBODIMENT

Figure 1:
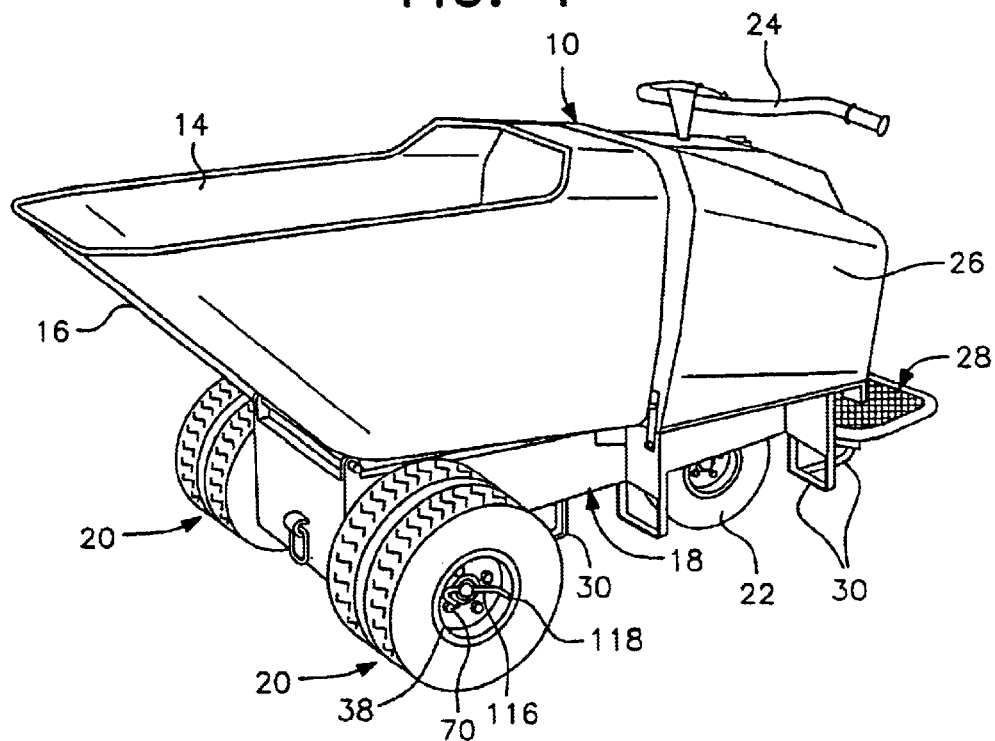
FIG. 1 is a perspective view of a mortar buggy of the present invention illustrating the front dual supporting and driving wheels with a quick release hub of the present invention shown therein.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 2:
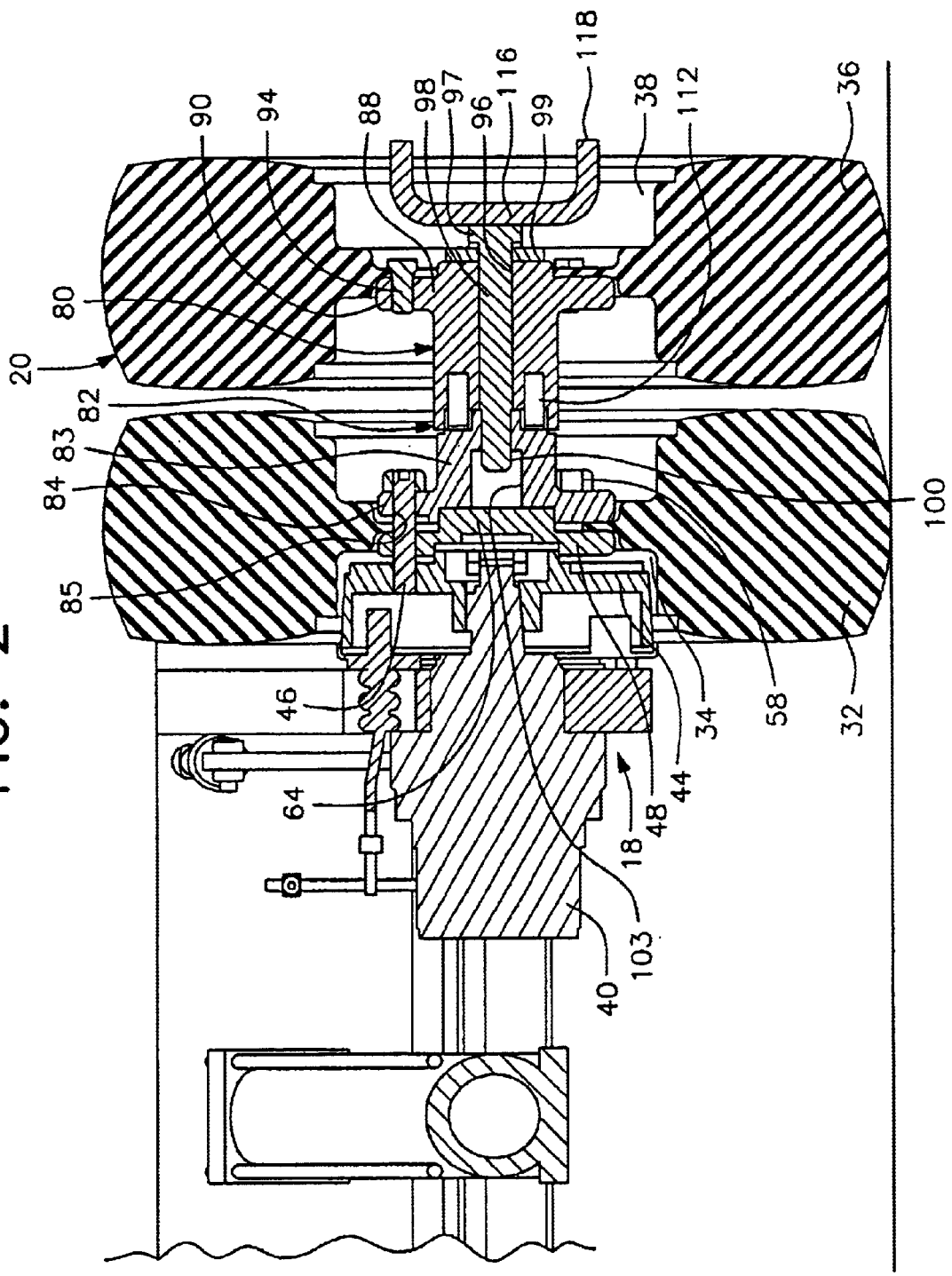
FIG. 2 is an enlarged vertical sectional view of the dual wheels quick release hub for the outer wheel.

Referring specifically to FIGS. 1–3, a mortar buggy incorporating the present invention therein is generally designated by reference numeral 10 and includes a pivotally supported hopper or bucket 12 having an open upper end area 14 and a slanted front wall 16 with a conventional hydraulic structure (not shown) provided to tilt the rearward end of the hopper 12 upwardly to dump mortar, gravel, concrete, soil or other material from the forward edge of the open upper end 14. The hopper 12 is supported by a frame structure 18 supported by a dual supporting and driving wheel assembly 20 at each side of the forward end of the mortar buggy 10. The rearward end of the frame and mortar buggy is supported and steerably controlled by dual wheels 22 on a single steerable rear axle that is manually controlled by an operator controlling the pivotal position of a steering mechanism in the form of a pair of handle bars 24. The mortar buggy is powered preferably by a gasoline engine which is enclosed by a removable engine cover 26. An operator's platform 28 is provided at the rear lower end of the frame in a position that an operator standing on the platform 28 can manually control the handle bars 24. All other controls for the buggy are provided in adjacent relation to enable operative control. The operator's platform may have angled or converging side edges for maneuverability and pivoted to an inoperative position to enable the operator to control the mortar buggy while walking behind. Forklift supporting members 30 are provided for receiving forklifts either longitudinally or transversely to facilitate insertion of forklift tines either longitudinally or transversely to lift and transport the mortar buggy to desired sites.

Figure 4:
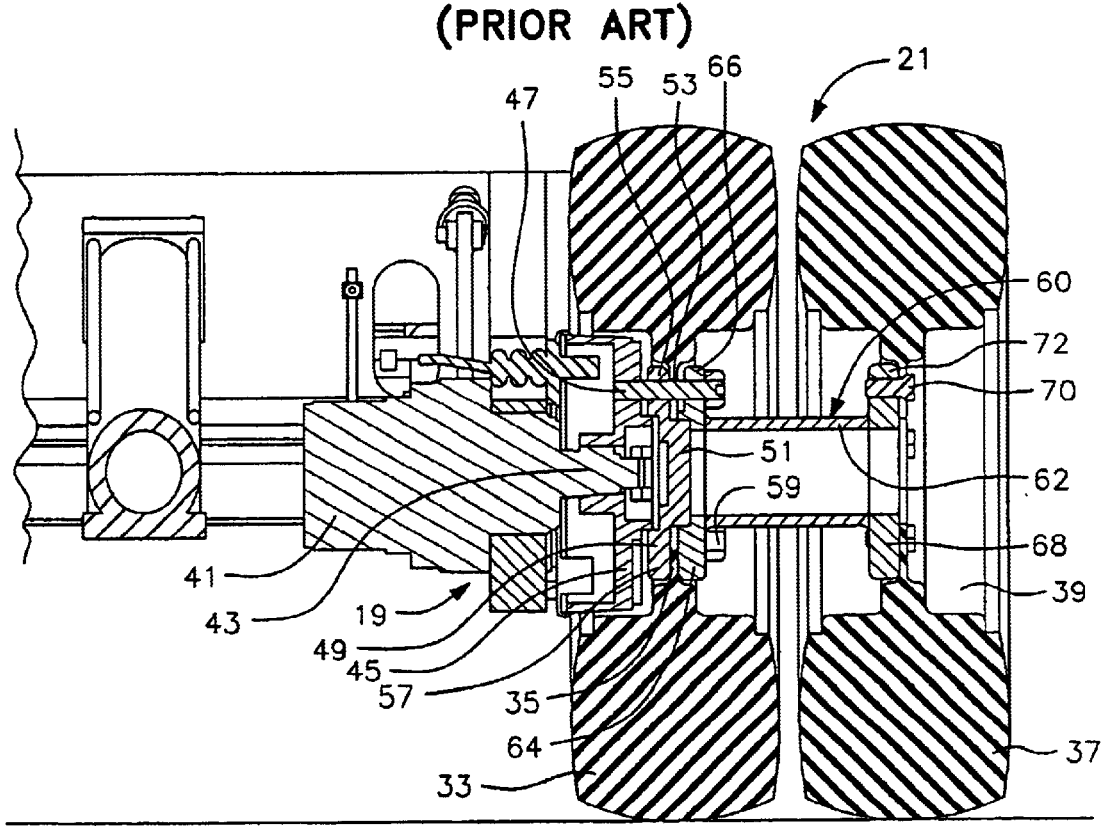
FIG. 4 is a sectional view, similar to FIG. 2, illustrating a prior art hub structure enabling the removal of the outer wheel requiring a lug wrench and lug nut and wrench manipulations to remove and reattach the outer wheel and axle extension.

FIG. 4 illustrates a typical prior art mortar buggy structure including dual front wheel assemblies 21 including an inner tire 33 with a rim structure 35, an outer tire 37 and a rim structure 39. The wheel assemblies 21 are supported and driven from a reduction gear unit 41 driven by the engine (not shown). The reduction gear 41 is supported by frame 19 and includes an output shaft 43 drivingly connected to a brake drum 45. The brake drum has stud bolts 47 attached thereto which extend through an inner hub 49 of hat shaped configuration having a central projecting portion 51 which extends through an opening 53 in the center part of the rim 35 which has a plurality of openings receiving the stud bolts 47. The brake drum 45 includes five lug bolts or stud bolts 47 which extend through corresponding openings 55 in the hub 49 and corresponding openings 57 in the inner flange of the rim 39 which has the five lug pattern incorporated therein. The studs 47 receive lug nuts 59 on the outer end thereof in a position accessible to a lug wrench.

In the prior art as illustrated in FIG. 4, a tubular hub extension 60 includes a tubular center portion 62 having a flange 64 on the inner end thereof with apertures 66 therein positioned on the studs 47 and receiving the lug nuts 59 thereby rigidly attaching the hub or axle extension 60 to the hub 49 and brake drum 45. The outer end of the tubular center portion 62 includes an outer hub in the form of a flange 68 that is parallel to the flange 64 and spaced therefrom a sufficient distance that the flange 68 supports the outer tire 37 and the outer wheel rim 39 with stud bolts 70 securing the interior flange of the wheel rim 39 to the flange 68 with the lug bolts 70 being threaded into the flange 68 for mounting the outer tire and wheel to the axle extension 60. In some prior art mortar buggies, different types of brakes are used such as an external band engaging and tightening against the outer surface of a flange on the drive axle. In that event, the stud bolts 47 would be connected to a flange secured directly to drive shaft 43.

In order to remove the outer tire 37 and wheel 39 from the prior art dual wheel assembly 21, it is necessary to lift the frame 19 in order that the wheels 33 and 37 are spaced from a supporting surface. The lug bolts 70 may then be removed by using a suitable lug wrench to unscrew the lug bolts 70 from the threaded openings 72 in flange 68. This procedure will expose the flange 68, the axle extension 60 and the lug nuts 59 which hold the axle extension 60, flange 64 on the tubular member 62 and the inner hub 49 to the brake drum 45. The lug nuts 59 can then be removed to enable removal of the axle extension 60 and the lug nuts 59 replaced to hold the inner flange of the inner rim 35 to the hub 49 and also hold the hub 49 assembled onto the brake drum 45.

When the above procedure is completed, the prior art mortar buggy can then be lowered and driven through a doorway that has a width less than the overall width of the mortar buggy as defined by the outer surfaces of the dual tire assemblies 21 providing the doorway has a width greater than the outer surfaces of the inner tires and wheels. When the frame 19 of the mortar buggy is lowered, the inner tires 33 at each side of the mortar buggy support the mortar buggy as it is driven through the doorway. After reaching the other side of the doorway, the procedure can be reversed in order to reattach the axle extensions 60 along with the outer tires 37 and the outer wheels 39.

Reattachment of the axle extension 60 and outer tires and wheels is accomplished by again lifting frame 19, removing the lug nuts 59 by using a lug wrench, positioning the flange 64 on the tubular member 62 on the studs 47 and tightening the lug nuts 59 with a lug wrench. The outer tire and wheel is then positioned with the apertures in the inner flange of the wheel rim 39 being aligned with the openings 72 and the lug bolts 70 threaded into the openings 72 by the use of a suitable lug wrench. Removal and replacement of these components introduces the risk of the removed components such as the lug bolts 70, the axle extension 60 and the lug nuts 59 becoming misplaced, covered with material or debris and otherwise difficult to handle during removal and assembly thus requiring considerable time and effort in removing and replacing the outer tires and wheels so the prior art mortar buggy can move between a job site and a point of supply of mortar or other material.

The quick release hub extension of the present invention is illustrated in FIGS. 1–3 and the components 18–58 are the same as components 19–59 in the prior art mortar buggy shown in FIG. 4. The quick release hub of the present invention is generally designated by reference numeral 80. The reduction gear drive 40, brake drum 44, inner hub 48 and stud bolts 46 attached to the brake drum 44 and extending through the inner hub 48 in the quick release hub 80 of the present invention are the same as in the prior art structure shown in FIG. 4.

Figure 5:
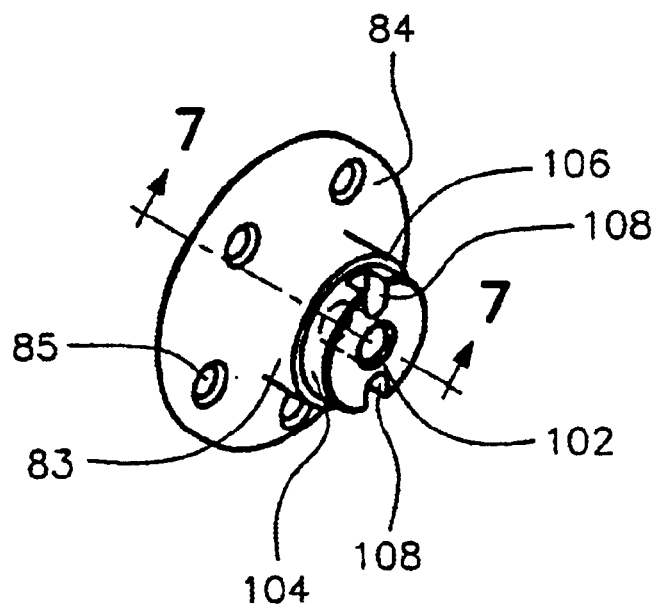
FIG. 5 is a perspective view of the inner hub component illustrating the radial slots for receiving drive pins on the outer hub component.
Figure 6:
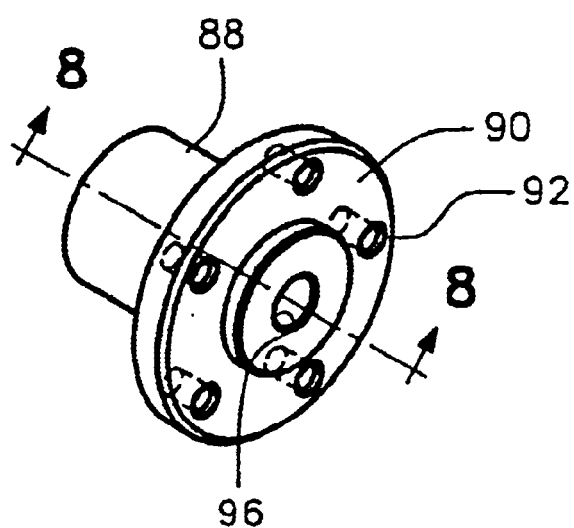
FIG. 6 is a perspective view of the outer hub component illustrating the supporting flange for the outer wheel.
Figure 7:
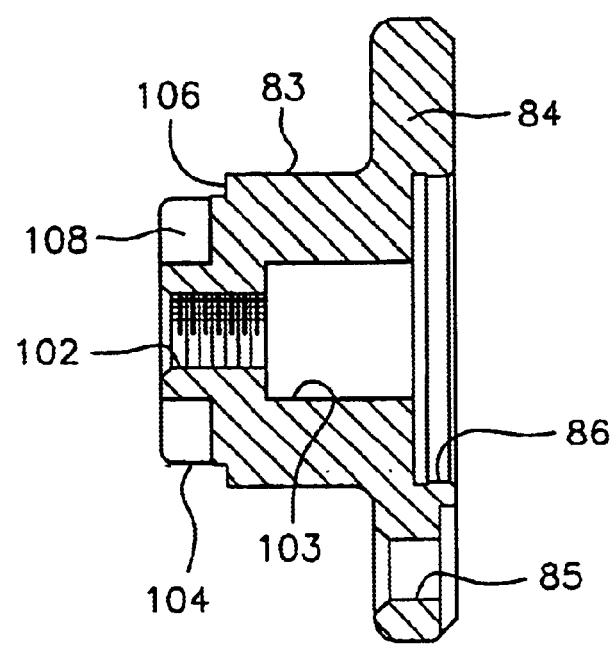
FIG. 7 is a sectional view of the inner hub component taken along section line 7—7 on FIG. 5.
Figure 8:
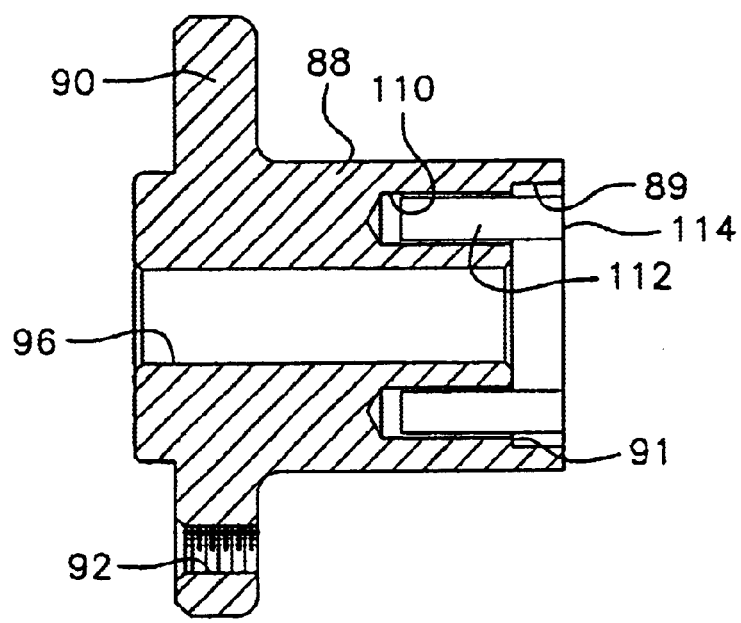
FIG. 8 is a sectional view of the outer hub component taken along section line 8—8 on FIG. 6.

The quick release hub 80 of the present invention includes an axle extension 82 including a hat shaped inner hub component 83, shown in FIGS. 5 and 7, including a flange 84 at its inner end having openings 85 receiving the stud bolts 46 attached to brake drum 44 with lug nuts 58 holding the flange 84 on the stud bolts 46. The hat shaped inner hub component 83 includes an axial recess 86 which engages and receives the axial face of a projection 64 on the inner hub 48. The quick release hub 80 also includes a tubular outer hub component 88, shown in FIGS. 6 and 8, having a flange 90 at its outer end provided with threaded openings 92 to receive lug bolts 94 which thread into the threaded lug bolt openings 92 to secure the flange on the outer wheel 38 to the outer hub component 88. The tubular outer hub extension component 88 includes a longitudinal bore 96 therethrough which is aligned with an internally threaded bore 102 in the inner hub component 83. A larger bore 103 extends from the inner end of bore 92 into communication with recess 86.

An elongated retaining member 98 is closely received through bore 96 and includes a screw threaded inner end 100 which screw threads into the interiorly threaded bore 102 and into bore 103 in the inner hub component 83 to securely retain the inner hub component 83 and the outer hub component 88 in assembled aligned relation. The retaining member 98 is a conventional bolt having a bolt head 97 engaging a large washer 99 which engages the outer end of outer hub component 88.

The inner end of the outer hub extension component 88 includes an internal peripheral recess 89 defining a peripheral inturned shoulder 91. The outer end of inner hub component 83 includes a peripheral external recess 104 defining an external shoulder 106. When hub components 83 and 88 are assembled, the recesses 89 and 104 telescope together and shoulders 91 and 106 abut. The outer end of inner hub component 83 includes a pair of diametrically opposed slots or recesses 108 which extend axially inwardly from the outer end thereof a distance less than the axial extent of the recess 104 with the surface of the recess 89 in outer hub component 88 forming a closure for the radial outer ends of the slots 108.

The inner end of outer hub component 88 includes a pair of diametrically opposed axial bores 110 having closed inner ends and having a circular cross section with the open ends aligned with shoulder 91 formed by recess 89. Cylindrical drive pins 112 are press fitted into the bores 110 with outer ends 114 of pins 112 extending into recess 89 a distance so that the drive pins 112 are closely received in the radial slots 104 and the ends 114 of pins 112 terminate closely adjacent the axial inner ends of slots 104 thereby forming a positive drive connection between hub components 83 and 88.

The bolt head 97 on the outer end of the retaining member 98 includes a transversely extending rod-like member 116 perpendicular to the longitudinal axis of the retaining member 98 and extending substantially across the diameter of the lug pattern defined by the lug bolts 94. The outer ends of the transverse member 116 include projections 118 extending perpendicularly from the ends of member 116 and forming curved continuations of the ends of the transverse member 116 with the projections 118 being parallel to the retaining member 98 but spaced radially outwardly therefrom. The transverse member 116 and the projections 118 form a generally laterally opening U-shaped member accessible from the outside surface of the outside tire and wheel 38 thereby enabling an elongated rigid rod-type tool 120 to be placed diametrically of the outer wheel 38' and engaged with opposite edges of the projections 118 to exert rotational torque onto the retaining member 98 for either loosening the retaining member 98 or tightening the retaining member 98.

When the dual tire assembly has both tires and wheels thereon as illustrated in FIG. 2, the structure of the present invention enables the quick and easy removal of the outer tire and wheel. As illustrated in FIG. 3, the rod-like tool 120 is used to rotate the retaining member 98 in counterclockwise relation to enable quick removal of the entire outer tire and wheel including the tubular outer hub component 88 as the threaded retaining member 98 is unthreaded from the threaded aperture 102 in the inner hub component 83. The retaining member 98 may be rotatably retained in the longitudinal bore 96 in the tubular outer hub component 88 to retain the retaining member 98 in position to facilitate subsequent reattachment of the outer wheel 38 and hub component 88 to the inner hub component 83. As illustrated in FIG. 3, the elongated rigid rod 120 may be easily engaged with the edges of the projections 118 to secure the dual tires and wheels in assembled relation or permit the outer tire and wheel 38 and outer hub component 88 to be removed or retained in assembled relation. When the outer tire and wheel 38 and outer hub component 88 have been removed, the mortar buggy may be driven through a narrow doorway or the like which has a width less than the total width of the mortar buggy when dual front wheels are in use as long as the width of the doorway is at least slightly greater than the total width of the mortar buggy when the outer wheels 38 and outer hub components 88 have been removed. After movement through the narrow doorway, the outer wheels 38 and outer hub components 88 may be easily reassembled by aligning the outer hub component 88 with the inner hub component 83 and tightening the retaining member 98 by using the rigid bar tool 120.

Since the inner hub component 83 of the quick release hub 80 remains in place and the inner tire 32 and inner wheel 34 remain rigidly affixed to the brake drum 44, the inner wheel 32 can be driven onto a temporary supporting block having a width not greater than the width of the inner tire 32 thereby elevating the outer tire 36 to enable the outer tire 36, outer wheel 38 and tubular outer hub component 88 to be easily removed and reattached without using a lifting mechanism engaging the frame which is necessary in the prior art device as illustrated in FIG. 4.

When removing and reattaching both outer tires and wheels when using the present invention, substantial time and labor are saved. The use of a lifting device for the frame 18 has been eliminated thereby removing any risk of the lifting device slipping in relation to the frame or otherwise creating a dangerous situation. Since all of the components in the present invention are retained in connected relationship except for the retaining member 98 which can be disconnected from the outer hub component 88, the risk of misplacing loose components as occurs when using the prior art device has been avoided. The reduced time and labor in removing and replacing the outer tires and wheels of the mortar buggy of the present invention enables more efficient transport of mortar or other material thereby enabling more effective completion of building structures when using the mortar buggy with the quick release hub assembly of this invention.

Figure 9:
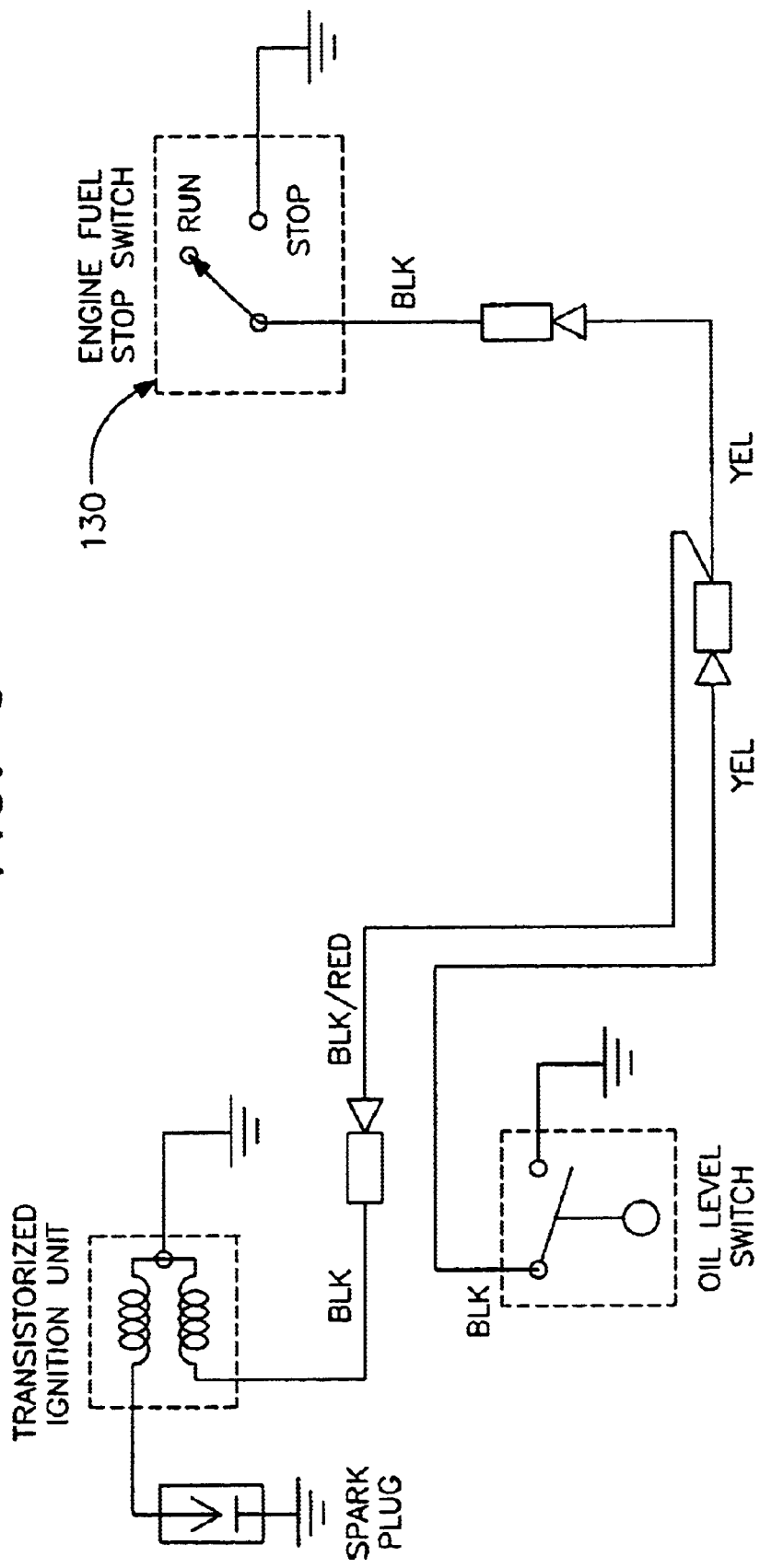
FIG. 9 is a schematic view illustrating the association of an engine electrical and fuel shut off in the mortar buggy.

FIG. 9 is a schematic wiring diagram of a recoil start electrical system for the mortar buggy engine which includes a combination engine electrical and fuel shut off 130 including "run" and "stop" positions. The combination engine electrical and fuel shut off 130 also actuates a solenoid operated fuel valve which, in the "run" position, the fuel valve will be opened. When the combination engine electrical and fuel shut off 130 is moved to the "stop" position, the electrical system will be grounded and the fuel valve will move automatically to a closed position thus interrupting the supply of fuel, such as gasoline, to the engine thereby precluding the possibility that fuel could run through an engine carburetor or otherwise leak onto the floor or into the engine. Accordingly, an operator of the mortar buggy will automatically open the fuel valve when the combination engine electrical and fuel shut off 130 is moved to the "run" position and automatically closes the fuel supply valve when moving the combination engine electrical and fuel shut off to the "stop" position. This eliminates the necessity of the operator manually closing the fuel supply valve when the mortar buggy use cycle has been completed. A similar switch can be incorporated into an engine electric start system with the engine electrical switch also controlling the fuel supply valve.

Figure 10:
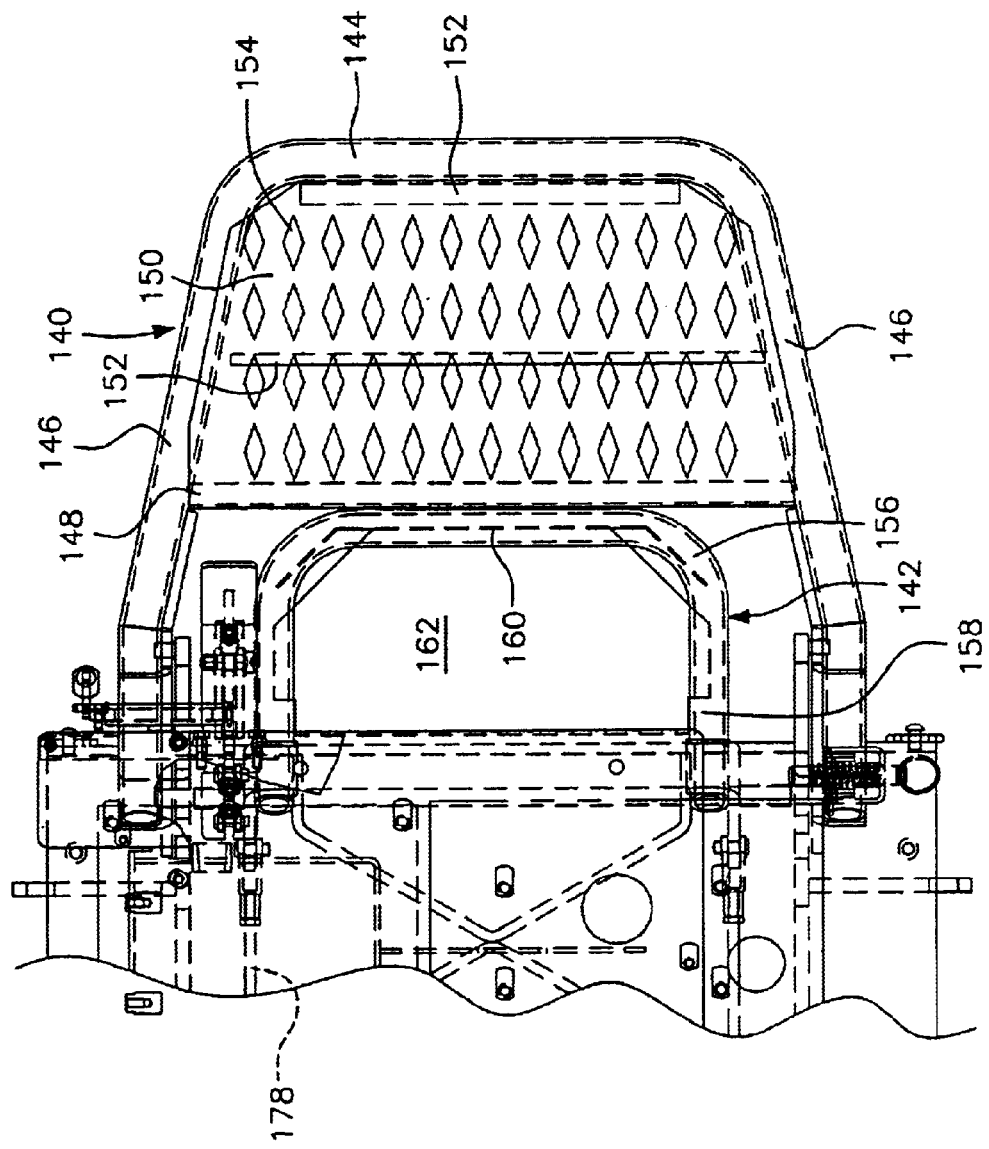
FIG. 10 is a top plan view of the operator's platform and brake actuator of the mortar buggy.
Figure 11:
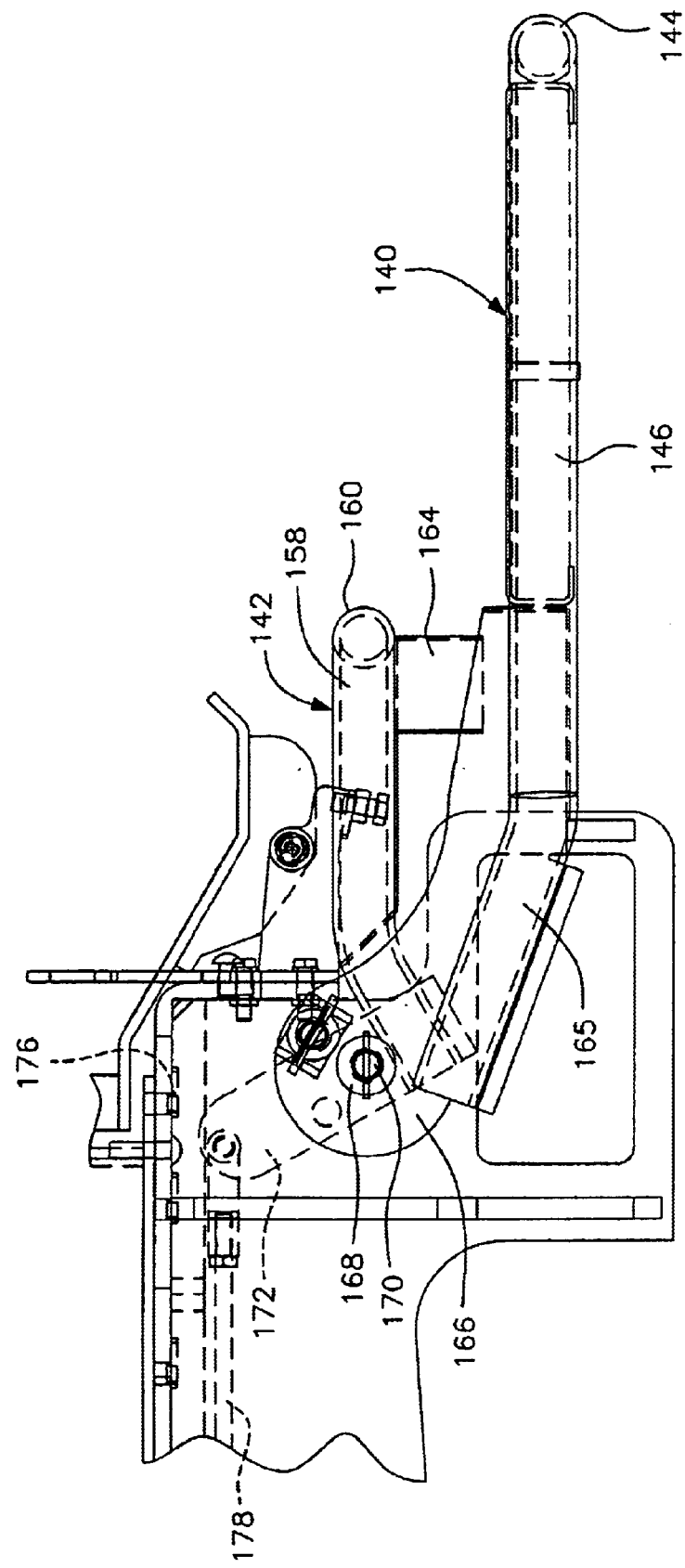
FIG. 11 is a side elevational view of the operator's platform and brake actuator.
Figure 12:
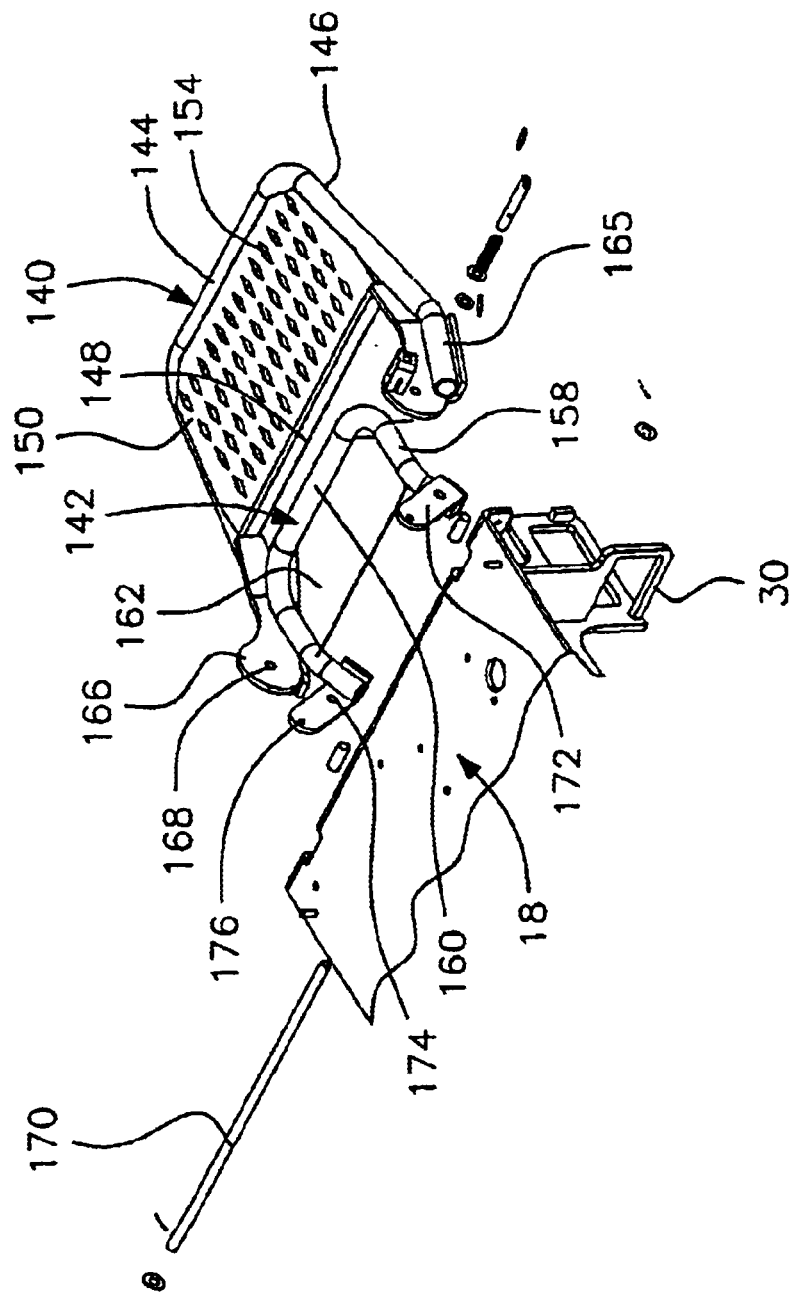
FIG. 12 is an exploded perspective view of the operator's platform and brake actuator.

FIGS. 10–12 illustrate an operator's platform 140 at the rear of the mortar buggy and a brake actuator 142 positioned immediately forwardly of the area of the operator's platform that is occupied by the feet of the operator. The operator's platform includes a generally U-shaped frame 144 preferably constructed of tubular material and including side edge members 146 which diverge forwardly thereby, in effect, reducing the rear width of the operator's platform to facilitate maneuverability of the mortar buggy. A transverse member 148 interconnects the side members 146 in spaced parallel relation to the rearward portion of the platform 140. A plate or deck member 150 closes the area of the platform 140 with the forward edge thereof being supported by the member 148 and the rearward edge being supported by a flange 152 on the rearward member of the operator's platform and an intermediate support 152 is provided between the cross member 148 and the flange 152 to support the plate 150. The plate 150 is provided with a plurality of apertures 154, preferably of diamond shape, to permit dirt which may fall upon or otherwise be placed on the plate 150 to move downwardly therethrough to maintain the operator's platform 140 in a relatively clean condition to avoid interference with the feet of the operator when placed on the platform 140.

The brake actuator 142 functions as a pivotal brake pedal and includes a generally U-shaped peripheral bar member 156 in the form of a tube formed into a U-shaped configuration with the forward ends of the legs 158 of the brake actuator being pivotally supported and the rearward member or bight portion 160 generally paralleling the forward edge of the plate 150 and located in spaced parallel relation above the platform 140. The interior of the U-shaped brake actuator 142 includes a solid plate 162 terminating rearwardly of the forward ends of the legs 158. The brake actuator 142 extends substantially throughout the width of the operator's platform 140 thereby enabling either foot of the operator to be used to operate the brake actuator while the other foot of the operator remains stably supported on the plate or deck 150 of the operator's platform 140. A flange 164 depends from the brake actuator 142 to form a splash guard along and underneath of the components 158 and 160 of the brake actuator 142 as illustrated in FIG. 11 to prevent soil or other debris from passing through the space between the forward edge of the operator's platform 140 and the brake actuator 142.

As illustrated in FIG. 12, the forward end of the side members 146 of the operator's platform incline upwardly at 165 and alongside support end members 166 on platform 140. An aperture 168 in each member 166 receives a pivot support rod 170 which extends through the apertures 168 in end members 166. The rod 170 also extends through support structure in the rearward portion of the frame 18 of the mortar buggy. The forward ends of the legs 158 of the U-shaped brake actuator 142 includes an upwardly extending flange 172 having spaced apertures 174 and 176 therein with the pivot rod 170 extending through the aperture 174 to enable pivotal movement of the brake actuator 142 about the rod 170. The rod 170 supports the forward end of the operator's platform in a manner that lets it pivot upwardly to an inoperative position along with the brake actuator 142. The aperture 176 in the upper end of the flanges 172 are connected to brake actuating rods 178 which extend forwardly beneath the frame 18 as illustrated in FIGS. 10 and 11 to actuate the brakes on the dual front wheels of the mortar buggy.

Supporting both the operator's platform 140 and the brake actuator 142 from the same pivot rod 170 enables these components to be pivoted upwardly to a stored inoperative position when it is desired to operate the mortar buggy with the operator walking behind the buggy.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A quick release hub for outer wheels of a vehicle dual wheel assembly comprising an axle extension between an inner wheel and an outer wheel of a dual wheel assembly, said axle extension including an inner hub component secured to an inner wheel and an outer hub component secured to an outer wheel, the inner ends of said hub components including telescopically engaged and abutting surfaces to maintain the hub components in alignment and a single retaining member interconnenting said hub components to enable separation of the outer wheel and outer hub component from the inner wheel and inner hub component and reassembly of the outer hub component onto the inner hub component by manipulating said single retaining member, said inner hub component and outer hub component including a driving connection rigidly engaged when the hub components are telescopically and abuttingly engaged.

2. The device as defined in claim 1, wherein said driving connection includes a plurality of axially extending pins on one hub component and a plurality of axially extending recesses in the other hub component closely telescopically receiving said pins to form a positive drive connection between the hub components.

3. The device as defined in claim 1, wherein said retaining member is an elongated rod member having a threaded end and a transverse member at an opposite end, said retaining member extending through a bore in the outer hub component and threadedly engaged with a threaded bore in the inner hub component, said transverse member engaging the outer hub component and rigidly retaining said outer hub component in abutting telescopic relation on the inner hub component.

4. The device as defined in claim 3, wherein said transverse member includes a pair of projections extending laterally from the transverse member in spaced relation to the rotational axis of the retaining member to enable a rigid rod-like tool to engage with the projections for enabling the retaining member to be threaded and unthreaded in relation to the inner hub component.

5. The device as defined in claim 1, wherein said vehicle is a mortar buggy powered by an internal combustion engine having a fuel supply, a fuel supply valve between the engine and fuel supply and a combination electrical engine and fuel shut off associated with the engine and fuel supply valve to automatically close the fuel supply valve when the electrical engine and fuel shut off is moved to a stop position and automatically open the fuel supply valve when the electrical engine and fuel shut off is moved to a run position.

6. The device as defined in claim 1, wherein the vehicle having dual wheel assemblies is a mortar buggy with the dual wheel assemblies being located at the forward end thereof to enable the overall width of the mortar buggies to be reduced by removing the single retaining member, the outer hub component and outer wheel of each dual wheel assembly to enable the mortar buggy to pass through a restricted width opening.

7. The device as defined in claim 6, wherein an operator's platform is mounted at the rear of the mortar buggy to support an operator of the mortar buggy and a brake actuator mounted at the forward end portion of the platform and extending substantially throughout the width thereof to enable an operator occupying said platform to utilize either foot to manipulate the brace actuator.

8. The device as claimed in claim 7, wherein said mortar buggy includes an internal combustion engine having a fuel supply, a fuel supply valve between the engine and fuel supply and a combination electrical engine and fuel shut off associated with the engine and fuel supply valve to automatically close the fuel supply valve when the electrical engine and fuel shut off is moved to a stop position and automatically open the fuel supply valve when the combination electrical engine and fuel shut off is moved to a run position.

9. The quick release hub as claimed in claim 1 wherein said vehicle is a mortar buggy, controlled and operated by a stand up operator, said mortar buggy comprising a frame having a laterally spaced pair of dual wheel assemblies mounted adjacent a forward end thereof, a generally horizontal operator's platform mounted at a lower rear area of said frame to support an operator of the mortar buggy in a position to operate controls for said mortar buggy, said platform extending transversely of said frame and dimensioned to receive both feet of an operator and a horizontal rod-like brake actuator pivotally supported at the forward end portion of the platform and extending substantially throughout the transverse width thereof to enable an operator occupying said platform to utilize either foot to pivot the brake actuator.

10. A mortar buggy including dual wheel assemblies located on each side at the forward end thereof and a quick release hub for each outer wheel to enable the overall width of the mortar buggy to be reduced by removing the outer wheel of each dual wheel assembly, a single outer wheel retaining member to enable removal and remounting said outer wheels to enable the mortar buggy to pass through a restricted width opening, said retaining member being an elongated rod member having a threaded end engaging an inner wheel, said retaining member extending through a bore in an outer wheel and threadedly engaged with the inner wheel, a retaining device on said retaining member remote from said threaded end and engaging the outer wheel for retaining the outer wheel assembled in relation on the inner wheel.

11. The device as defined in claim 10, wherein said retaining device includes a washer and shoulder on an outer end engaging the outer wheel, a transverse member rigidly mounted on said retaining member at its outer end, a pair of projections extending laterally from said transverse member in spaced relation to the rotational axis of the retaining member to enable a rigid rod-like tool to engage the projections for enabling the retaining member to be threaded and unthreaded in relation to the inner wheel.

12. In a mortar buggy controlled and operated by a stand up operator including a frame, a horizontal operator's platform mounted at a lower rear end to extend beyond said frame to support an operator of the mortar buggy in a position for actuating mortar buggy controls, said platform extending transversely of said frame and dimensioned to receive both feet of an operator and a horizontal bar brake actuator pivotally supported at a forward portion of the platform and extending substantially throughout the width thereof to enable an operator occupying said platform to utilize either foot to manipulate the brake actuator.

13. A quick release hub for an outer wheel of a vehicle dual wheel assembly, said assembly including a drive axle, a brake drum mounted on said drive axle, a plurality of wheel mounting studs and lug nuts mounted on said brake drum, said quick release hub comprising an axle extension between an inner wheel and an outer wheel of said dual wheel assembly, said axle extension including an inner hub component having a peripheral flange at an end thereof between said wheels, said flange on said inner hub component including a plurality of openings receiving said wheel mounting studs on said brake drum and being secured to said brake drum by said lug nuts and an outer hub component having a peripheral flange at an end thereof between said wheels, said flange on the outer hub component having a plurality of openings therein receiving mounting bolts extending through openings in a rim of said outer wheel to secure said outer wheel to said outer hug component, the inner ends of said hub components including telescopially and abuttingly engaged surfaces to maintain the hub components in alignment and provide a positive driving connection between said hub components and said inner and outer wheels, a single retaining member extending through central portions of said hub components and interconnecting said hub components to enable separation of the outer wheel and outer hub component from the inner wheel and inner hub component and reassembly of the outer hub component onto the inner hub component by manipulating said single retaining member, said inner hub component and outer hub component including a driving connection rigidly engaged when the hub components are telescopically and abuttingly engaged.

14. The quick release hub as claimed in claim 13 wherein said driving connection includes interengaging axial projections and recess on said hub components, said axial projections and recesses being positioned inwardly of an exterior surface of said hub components forming said axle extension.

15. The quick release hub as claimed in claim 14, wherein said axial projections and recesses include a plurality of axial projecting pins in an inner end of one of said hub components and a plurality of axial recesses in an inner end of the other hub component, said flanges on said hub components having a diameter substantially greater than said hub components, said inner hub component having an internally threaded, centrally located bore, said retaining member including a rigid elongated rod having one end threadingly engaged with said threaded bore and its other end engaged with said outer hub component, said other end of said rod having a transverse member rigid therewith to facilitate rotational movement of said rod when connecting or disconnecting said hub components.

* * * * *